United States Patent [19]
Cochrane

[11] Patent Number: 5,259,461
[45] Date of Patent: Nov. 9, 1993

[54] CULTIVATOR SWEEP

[75] Inventor: James R. S. Cochrane, Cambridge, Canada

[73] Assignee: Case Corporation, Racine, Wis.

[21] Appl. No.: 819,284

[22] Filed: Jan. 13, 1992

[51] Int. Cl.$^5$ .......................................... A01B 39/20
[52] U.S. Cl. ...................... 172/730; 172/732; 111/152
[58] Field of Search ............... 172/193, 681, 699, 719, 172/720, 722, 724, 730, 732, 733, 765, 770; 111/124, 152, 154, 155

[56] References Cited

U.S. PATENT DOCUMENTS

| 960,194 | 5/1910 | Pobanz | 172/732 |
|---|---|---|---|
| 2,337,777 | 12/1943 | Seaholm | 172/722 |
| 2,889,788 | 6/1959 | Van Dorn | 172/730 X |
| 4,408,667 | 10/1983 | Jarvis | 172/730 X |
| 4,446,801 | 5/1984 | Machnee et al. | 111/152 |
| 4,580,639 | 4/1986 | Johnson | 172/730 |
| 4,697,646 | 10/1987 | Johnson et al. | |
| 4,787,462 | 11/1988 | Nichols | 172/730 |
| 4,850,435 | 7/1989 | Morris et al. | |
| 4,871,032 | 10/1989 | McGuire et al. | |

OTHER PUBLICATIONS

J. I. Case Company Part Drawing No. 1547183C1 illustrating a Cultivator Sweep dated Apr. 18, 1991.
Bourgault Industries-Cultivator Division Limited two-page brochure showing a Cultivator Sweep (undated).
Baldwin-Inplementos Agri'colas S.A. two-page brochure (undated) listing implement sweeps.
Wiese Corporation two-page brochure (dated 1989) listing chisel plows.
Adams Hard Facing Company two-page brochure (undated) showing cultivator sweeps.
Osmundson Manufacturing Company two-page brochure (undated) showing chisel plow sweep with sweeped nose.

*Primary Examiner*—Randolph A. Reese
*Assistant Examiner*—Spencer Warnick
*Attorney, Agent, or Firm*—Rudnick & Wolfe

[57] ABSTRACT

A cultivator sweep having a substantially constant cross-sectional thickness and configured with a generally triangular head portion including a pair of side edges diverging symmetrically rearward from a nose region. Each of the side edges is provided with a bevelled outer edge defining a blade region to enhance weed cutting ability of the sweep. Each blade region extends forwardly toward and terminates short of the foremost point of the sweep to provide the nose region with a width equal to at least two times the thickness of the sweep thereby increasing the strength and configuration of the nose region thus prolonging the useful life of the sweep. The sweep can also include in the attachment portion which is integrally formed with the head portion.

5 Claims, 2 Drawing Sheets

CULTIVATOR SWEEP

FIELD OF THE INVENTION

The present invention generally relates to agricultural equipment and, more particularly, to a cultivator sweep having a wear resistant nose or tip portion for enhancing operation and the useful life of the sweep.

BACKGROUND OF THE INVENTION

In an effort to optimize crop yield, farmers are known to till the soil to kill weeds which otherwise might rob the soil of valuable moisture and nutrients. Commercially available farm implements utilize a series of cultivator sweeps arranged on a wheeled frame of the implement and which are drawn through the soil beneath a top surface thereof and in a manner cutting the weed roots which lie in its path of travel.

A well known form of cultivator sweep has a generally V-shape configuration with a nose portion including a forwardmost ground penetrating point and a pair of wing portions which diverge outwardly and rearwardly from the point. Each wing portion is configured with "plating" or a bevel on their outer edges to improve both soil penetration and the ability for cutting roots as the sweep moves through the soil. The bevel on each outer edge either extends to the forwardmost point or stops just short thereof.

During operation, the cultivator sweep is normally disposed about 3 inches to about 6 inches below the top surface of the field being tilled. Some fields in which cultivator sweeps are used contain highly abrasive soils. Moreover, the tip or point on the sweep often contacts obstacles such as rocks and larger size roots as the cultivator sweep is drawn through the field. The point of the sweep, therefore, quickly wears away or is bent or broken thus resulting in a rounded point on the sweep.

As will be appreciated, a rounded or broken tip on the sweep detracts from the ability of the sweep to penetrate the soil and affects overall tillage efficiency. A sweep is typically secured to a depending arm or tine of the farm implement by bolts which provide a secure fitting but which are difficult to loosen after the sweep has been used for some time. Cultivator sweeps with worn tips need to be replaced and unfastening and replacement of the bolts is a tedious and time consuming process.

Consequently, a need and a desire exists for a cultivator sweep which provides increased strength for the nose and tip portion of the sweep thereby increasing the useful life of the sweep.

SUMMARY OF THE INVENTION

In view of the above and in accordance with the present invention there is provided a cultivator sweep formed with a substantially constant cross-sectional thickness and configured with a general triangular head portion including a pair of side edges diverging symmetrically rearward from a nose region. Each of the side edges is provided with a beveled outer edge defining a blade region to enhance weed cutting abilities of the sweep. Each blade region extends forwardly toward and terminates short of the foremost point of the sweep to provide the nose region with a width equal to at least two times the sweep thickness thereby increasing the strength and configuration of the nose region thus prolonging the useful life of the sweep.

In a preferred form of the invention, the sweep includes an attachment portion which is integrally formed with the head portion. The attachment portion is centrally located between the diverging side edges of the sweep and extends upwardly from the head portion to facilitate the attachment of the sweep to support structure of an agricultural apparatus.

In a most preferred form of the invention, the sweep is fabricated from a metal blank which is bent and shaped into the desired sweep configuration. The thickness of the blank is preferably greater than 0.250 inches.

A salient feature of the present invention concerns providing a V-shape cultivator sweep with a nose region equal in thickness to that of the blank from which it is formed and a width which is greater than twice the thickness of the material thickness of the sweep. The nose portion of a sweep so configured has greater wear characteristics, and greater strength without sacrificing soil penetration capabilities of the sweep.

Numerous other features and advantages of the present invention will become readily apparent from the following detailed description, the accompanying drawings, and the appended claims.

DETAILED DESCRIPTION OF THE INVENTION

Figure 1:
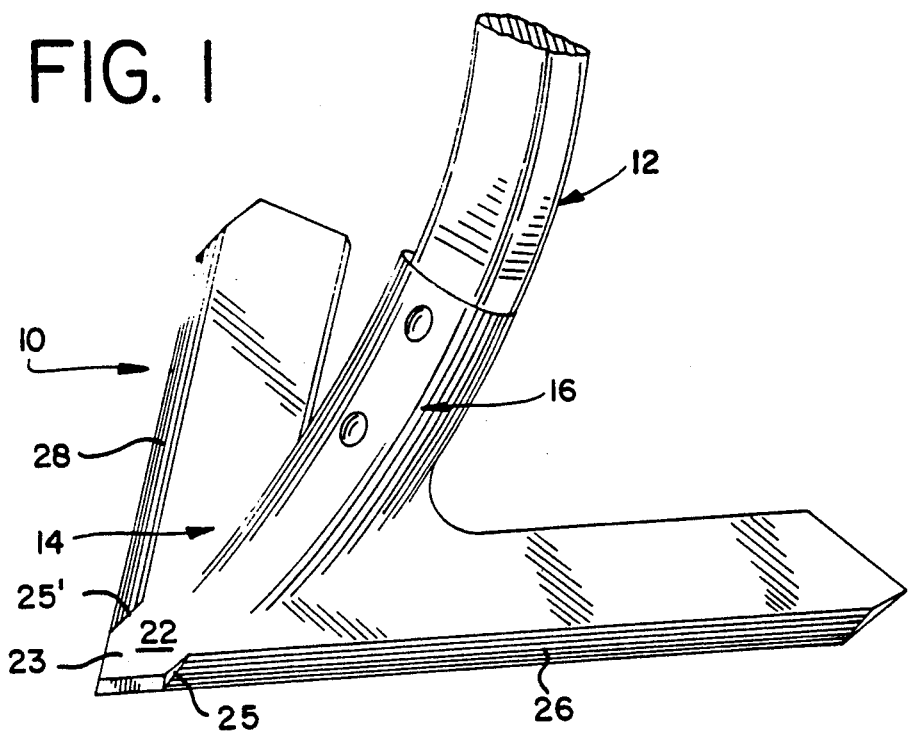
FIG. 1 is a perspective view of a cultivator sweep shown attached to a portion of a farm implement and incorporating principals of the present invention.

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Referring now to drawings, wherein like reference numerals refer to like parts throughout the several views, there is shown in FIG. 1 a cultivator sweep 10 which is adapted for releasable attachment to supporting structure 12 of a mobile agricultural apparatus. In the illustrated embodiment, sweep 10 includes an earth engaging head portion 14 formed integrally with an attachment portion 16 from a blank of metal material having a substantially constant cross-sectional thickness. In the most preferred form of the invention, the blank of material is made of metal or suitable metal alloys and has a substantially constant cross-sectional thickness above 0.250 inches.

Figure 2:
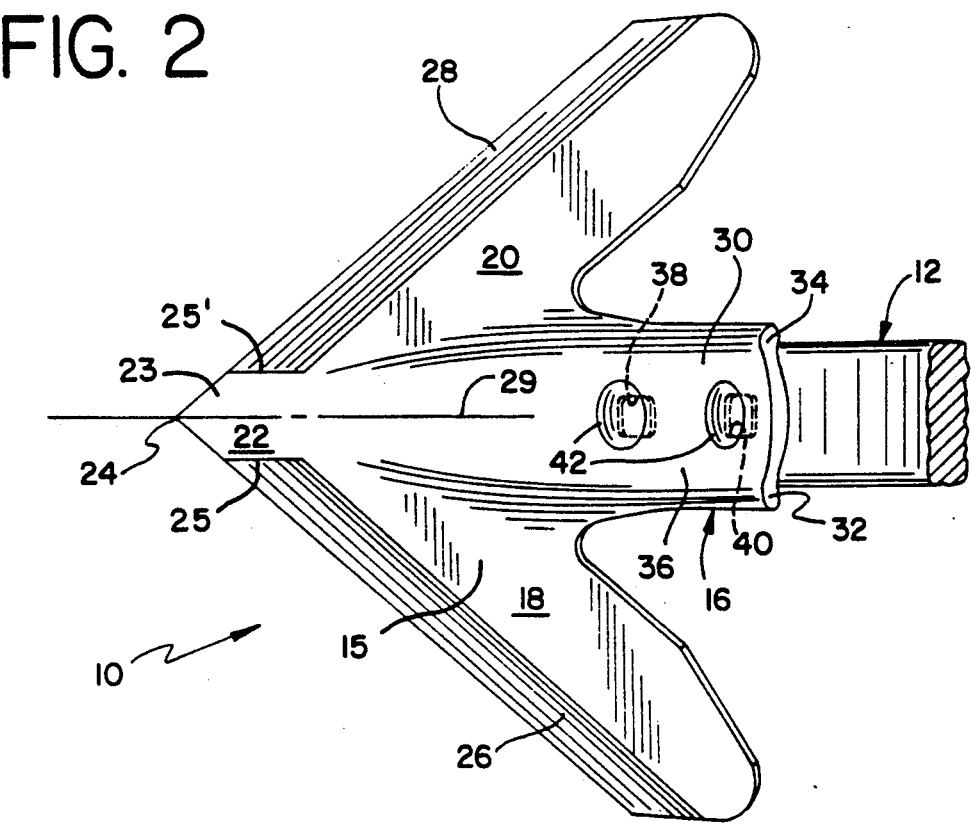
FIG. 2 is a top plan view of the sweep in FIG. 1.
Figure 3:
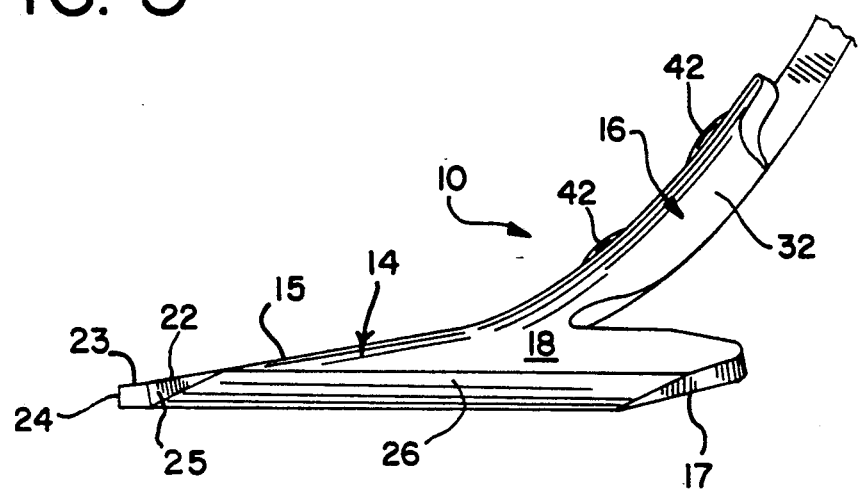
FIG. 3 is a side elevational view of the sweep shown in FIG. 1.

As shown in FIG. 2, the head portion 14 has a generally triangular planar configuration with a generally concave cross-sectional configuration. As shown in FIG. 3, the head portion 14 has a top surface 15 and a bottom surface 17. In the illustrated embodiment, the head portion 14 is provided with a pair of substantially identical wings 18 and 20 symmetrically extending rearwardly from a nose region 22 which includes a forwardmost ground penetrating point 24. The nose region 22 is provided with an upper or top surface 23 which extends rearwardly from the point 24 of the nose region 22. Moreover, the nose region 22 has a pair of generally vertical lateral sides 25, 25'; with each lateral side forming an angle relative to the top surface 23 of the nose region. Wings 18 and 20 each have a beveled outermost edge provided on the top surface 15 of the head portion and defining blade regions 26 and 28, respectively; with each blade region having a relatively thin outside edge for enhancing cutting ability of the sweep 10. As shown, the blade regions 26 and 28 on wings 18 and 20, respectively, are of substantially equal length. As schematically shown in FIG. 1, the lateral sides 25 and 25' of the nose region 22 are likewise angled relative to the beveled edge of the blade regions 26 and 28, respectively. A central fore-and-aft line of symmetry 29 for the head portion 14 extends rearwardly from the point 24.

As shown in FIGS. 2 and 3, the attachment portion 16 of sweep 10 includes a centrally located mounting bracket 30 projecting upwardly and rearwardly from the head portion 14 to facilitate attachment of the sweep 10 to the support structure 12 of the agricultural apparatus. As shown in FIG. 2, bracket 30 is somewhat channel-shaped having a pair of laterally spaced side walls 32 and 34 which are joined to each other by a lateral front wall 36. As will be appreciated, the side walls 32, 34 and front wall 36 of bracket 30 engage and embrace the sides of the supporting structure or tine 12 thereby resisting lateral movement of sweep 10 relative to the supporting structure 12. The front wall 36 of bracket 30 defines a pair of spaced apertures 38 and 40 for receiving bolts 42 or the like for releasably securing the bracket 30 of the sweep 10 to the supporting structure or tine 12.

Figure 4:
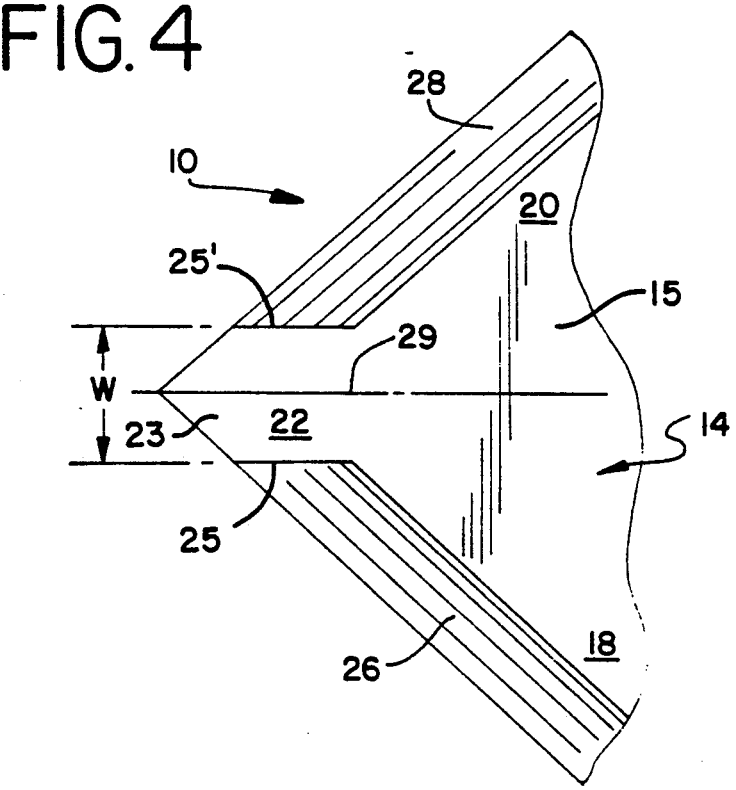
FIG. 4 is an enlarged top plan view of a nose region of the sweep.

Turning to FIG. 4, the bevel-like blade regions 26 and 28 provided on wings 18 and 20, respectively, extend forwardly from a rear edge of each wing and terminate short of the foremost point 24. A salient feature of the present invention being that the blade regions 26 and 28 stop short of the foremost point 24 such that the cross-sectional thickness of nose region 22 is equal to that of the blank from which sweep 10 is fabricated and has a width W equal to at least two times the cross-sectional thickness of the blank from which sweep 10 is fabricated. Preferably, the width of the nose region 22 has a thickness in the range of about two times to about 2.5 times the thickness of the blank from which the sweep 10 is fabricated.

The nose region 22 of a sweep so configured has greater wear capabilities than heretofore known sweeps. Moreover, configuring the nose region 22 equal in thickness to that of the sweep and with a width equal to at least two times the thickness of the sweep adds substantially to the strength of the nose region 22 without sacrificing the soil penetration capability of the sweep. Providing a sweep with a nose region having greater wear capability and greater strength naturally prolongs the usefulness of the sweep during operation and, thus, enhances the farming operations.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A cultivator sweep comprising an earth engaging pointed head portion formed integrally with an attachment portion from a unitary blank having a substantially constant cross-sectional thickness, said attachment portion projecting upwardly from the pointed head portion to allow the sweep to be attached to supporting structure of an agricultural apparatus, wherein said head portion includes a nose region with an upper surface extending rearwardly from a foremost tip of said head portion, said head portion further including a pair of wings symmetrically diverging rearwardly and horizontally from the nose region, with each wing having a bevel-like configuration formed on an upper surface of said head portion and extending along an outer edge forwardly from a rear edge of each wing portion and stopping short of a foremost point on said head portion, with said nose region including a pair of lateral sides to define the nose region with a lateral width equal to at least two times the cross-sectional thickness of said unitary blank thereby prolonging the useful life of said sweep, and wherein each lateral side of the nose region extends generally vertical relative to and forms an angle with the top surface of said nose region and the bevel-like configuration on the respective wing of the sweep.

2. The cultivator sweep according to claim 1 wherein the blank used to form said sweep is made of metal of thickness above 0.250 each thickness.

3. A cultivator sweep formed from a unitary blank and having a generally triangular head portion with a substantially constant cross-sectional thickness, said head portion being configured with a pair of side edges which diverge symmetrically rearward from a nose region having an upper surface, each side edge is configured with a beveled outer edge formed on a top surface of said head portion and defining a blade region to enhance cutting ability of the sweep, each blade region extending forwardly toward and terminating short of a foremost point on said head portion, and wherein said nose region includes a pair of generally vertical sides which define a width for said nose region which is equal to at least two times the cross-sectional thickness of said unitary blank thereby increasing the strength of the nose region and thus prolonging the life of the sweep, and wherein each vertical side of the nose region forms an angle with the top surface of said nose region and the respective beveled outer edge on the head portion of the sweep.

4. The cultivator sweep according to claim 3 further including a centrally disposed attachment portion formed integrally with said head portion and projecting upwardly from the head portion.

5. The cultivator sweep according to claim 3 wherein the blade regions on said side edges are of substantially equal length.

* * * * *